Nov. 16, 1965 R. A. FREGGENS 3,218,502

HIGH POWER ELECTRON DISCHARGE DEVICE

Filed March 16, 1961

WITNESSES

Gordon H. Telfer

Robert C. Baird

INVENTOR

Robert A. Freggens.

BY

Charles F. Renz

ATTORNEY

United States Patent Office 3,218,502
Patented Nov. 16, 1965

3,218,502

HIGH POWER ELECTRON DISCHARGE DEVICE

Robert A. Freggens, Elmira, N.Y., assignor to Westinghouse Electric Corporation, East Pittsburgh, Pa., a corporation of Pennsylvania Filed Mar. 16, 1961, Ser. No. 96,188
5 Claims. (Cl. 313—348)

This invention relates generally to high power electron discharge devices and, more particularly, to improved structural arrangements for such devices.

There is a need for very high power, high dissipation tubes for use in certain applications such as large audio amplifier systems. Such systems are used to drive electro-magnetic vibration tables which are used for testing of electronic components and the like for military systems, for example, which must operate under severe conditions. The system and the power amplifier tube used in it must have low distortion or faithful reproduction of the input and output waveforms because of desirability of being able to provide precisely controlled test conditions and because two such tubes are often used in push-pull relationship. Since the tube operates into reactive loads, high plate dissipation is required because resistive losses in the load are small and large electron currents bombard the plate.

The mode of operation for a device of this type requires that no current be drawn to the grid of the tube. By allowing the grid to rise to a positive potential, a portion of the space current would be drawn to the grid. This current will change the grid-to-cathode impedance from an infinite impedance to a finite value. This finite impedance will cause a shift in load line of the driver stage. The result is an introduction of harmonic frequencies not originally present in the input signal. Thus a distorted output signal results. Therefore, the grid voltage should never exceed zero volts.

In order to pass large currents through a practical device, one must develop a large perveance. The relationship between current, voltage, and perveance was given by Child's Law, $$i_s=K\left(e_g+\frac{e_p}{\mu}\right)^{3/2}$$

where $i_s$=instantaneous space current
$e_g$=grid voltage (instantaneous)
$e_p$=plate voltage (instantaneous)
$\mu$=amplification factor
$K$=perveance Obviously, a larger K value will produce greater currents for a given set of instantaneous voltages on grid and plate.

The grid voltage $e_g$ may be allowed to equal 0 volts as a maximum as stated previously. An increase in value of the second components of the above equation may be accomplished by reduction in $\mu$ but undesirable cut-off characteristics result at high plate voltages. Therefore, for substantial increase in $i_s$, the perveance K must be increased.

The expression for perveance in a high vacuum triode is as follows:

$$K=\frac{(1.47\times10^{-5})(k_1)l}{\left[(r_g\beta^2c_g)^{2/3}+\frac{1}{\mu}(r_p\beta^2c_p)^{2/3}\right]^{3/2}}$$

where $l$=active filament length
$k_1$=Harris factor, a function of the filamentary emitter
$r_g$=radius of grid
$r_p$=radius of plate
$\beta^2c_g$=Langmuir function $$f\left(\frac{r_g}{r_c}\right)$$

$\beta^2c_p$=Langmuir function $$f\left(\frac{r_a}{r_c}\right)$$

$r_c$=radius of cathode
$\mu$=amplification factor

Factors which will yield high perveance are therefore:

(1) long active length,
(2) Close grid to cathode spacing,
(3) Close cathode to plate spacing,
(4) High amplification factor,
(5) Close approximation of solid filament circle.

Since a predetermined level of space charge emission must be available, a definite value of emitter area is required. Knowledge of approximate operating efficiencies demands particular anode areas to dissipate unused power. Hence large circles for both grid, cathode and anode are required for a high power device.

Present tube designs generally use a plurality of free-hung filaments as the cathode surrounded by a grid formed of a helically wound wire on six to eight vertical supports of relatively large diameter. The anode in conventional tubes is usually a metal cylinder coaxial with the grid. Such designs often fail to provide the faithful reproduction of the input and output waveforms which is desired because of distortion resulting from mis-alignment between the cathode filaments and grid. Also high power operation is limited because grid and filament mis-alignment produces regions of very high current on the plate. Uneven plate current distribution results in uneven heating of the anode and possible over-heating in those areas where the current is particularly high with the danger of permanent damage to the device.

Other disadvantages of prior art devices result from the fact that the grid employed has relatively large openings permitting electric field variation which contributes to nonuniform dissipation on the anode. Also factors are that the grid wires have different cross-sectional dimensions and the openings are considerably larger in one dimension than the other.

It is particularly desirable in those applications where two tubes are used in push-pull operation such that they are alternately conducting, that each tube provide ultra-linear, low distortion operation so that there is no appreciable change in the operating characteristic upon cross over from one tube to the other.

It is, therefore, an object of the present invention to provide an improved, high power electron discharge device.

Another object is to provide a high power electron discharge device exhibiting a high degree of linearity between its input and output signals.

Another object is to provide a high power electron discharge device permitting high heat dissipation on the anode.

Another object is to provide a high power electron discharge device having a very high perveance.

In accordance with the present invention there is provided in an electron discharge device a cathode of a plurality of filaments each under tension to prevent any shift of position during operation, with a grid surrounding the cathode having openings which are small and having sides of the same order of magnitude in length. In addition, a concentric, coaxial heavy wall anode is provided around the grid. In this way preciseness of spacing between the cathode and grid is maintained by the tensioned filaments. Field uniformity is provided by the uniform grid openings. The heavy wall anode which can be liquid cooled permits high heat dissipation. This combination of features therefore results in a high power electron discharge device providing linearity and high dissipation not provided by devices known to the prior art.

The features of the present invention which are believed to be novel are set forth with particularity in the appended claims. The present invention together with the above-mentioned and further objects and advantages thereof may best be understood by reference to the following description, taken in connection with the accompanying drawings, in which:

Figures 1, 2, 3:
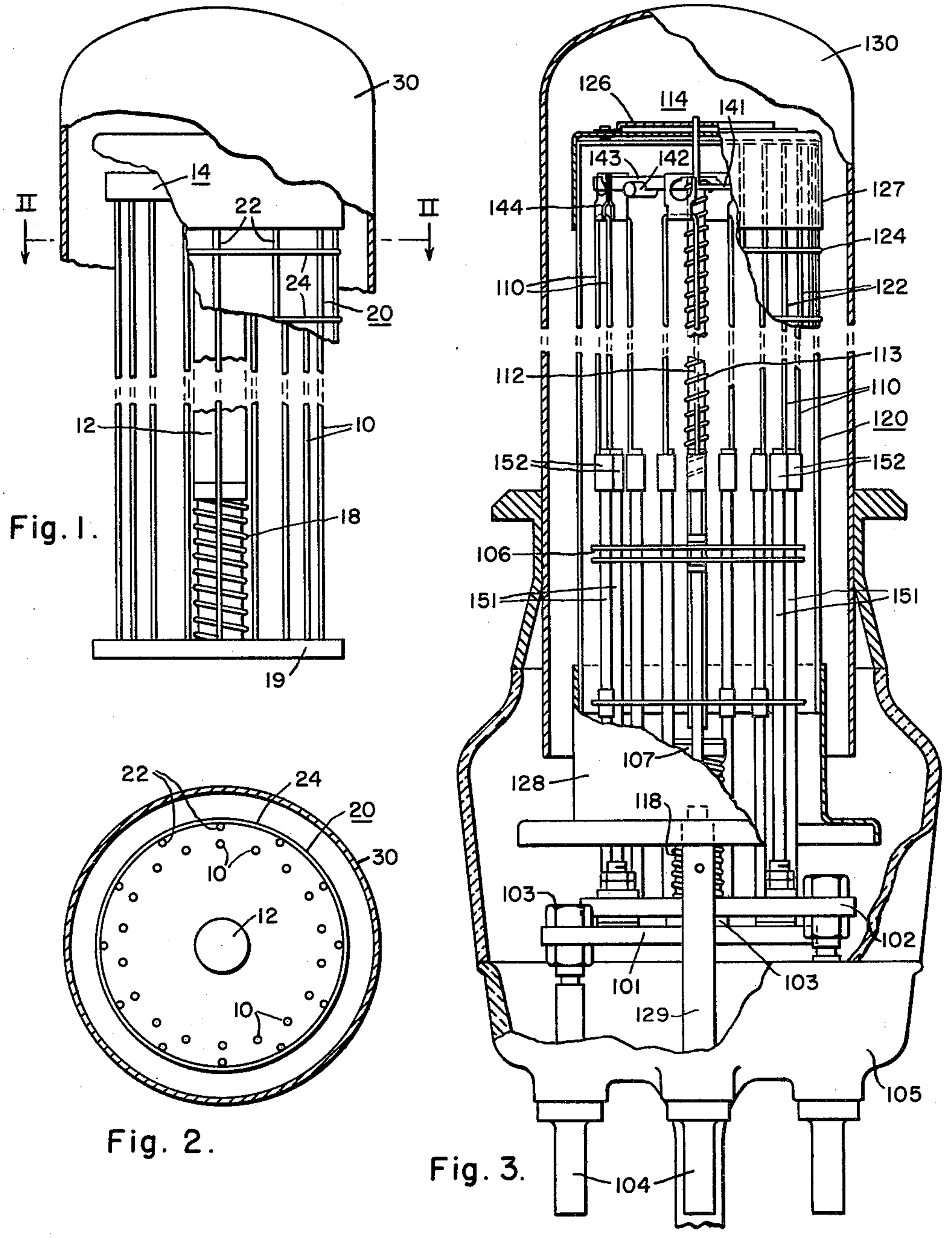
FIGURE 1 is a cross sectional view, partly broken away, of a generalized form of the present invention.
FIG. 2 is a sectional view taken along the line II—II of FIG. 1.
FIG. 3 is a cross sectional view of an actual device formed in accordance with the present invention.

Referring to FIGS. 1 and 2 there is shown a plurality of electron emissive filaments 10 disposed around a center rod 12 such that they define a cylinder which is coaxial with the center rod 12. The filaments 10 are supported at the top by a support means 14 which is supported by the center rod 12. At the bottom, the filaments 10 are fastened to a fixed support 19. The center rod 12 is spring loaded by a spring 18 acting against the support member 19 at the bottom so that it is possible to shift upwardly in order to compensate for any thermal expansion of the filaments 10. While the exact nature of the filament support structure is not critical to this invention, it must be such as to keep the filaments uniformly straight throughout operation.

Surrounding the filaments 10 and supported at the top from the same center rod 12 is disposed a grid 20 having a first plurality of wires 22 in a first direction and a second plurality of wires 24 in a second direction such that they intersect each other at numerous points and thus create small windows in the grid 20. It is necessary that the quadrangular openings or windows have side dimensions which are of the same order of magnitude in length on all sides. It is also the case that the grid wires in the two directions are of approximately the same diameter. In this way, field uniformity through the grid is preserved. The grid 20 shown is of the type employing individual vertical and horizontal wires. Other configurations are also suitable such as two helices wound, one over the other, in different directions. Grids of the type suitable for this invention are often known in the art as "basket" grids. It is to be noted that within the meaning of the terms as used herein, a first and second plurality of "wires" includes instances in which one piece of wire is wound as a helix or the like. For typical devices, the grid openings may be of a size from about .125 to about .500 in. using wires from about .008 to about .030 in. in diameter.

Surrounding the grid and coaxial with it there is disposed a relatively thick anode 30 of metal which preferably comprises part of the outside wall of the device so that it may be liquid cooled by well known means. In this way high heat dissipation is provided. The anode 30 should be of a good heat conducting metal such as copper and have a thickness in the range from about .125 to .500 in.

It will be noted from the generalized embodiment of FIGS. 1 and 2 that the present invention has at least two significant aspects. The combination of the cathode filaments 10 under tension and the basket type grid 20 provides uniform spacing, uniform field distribution and a high perveance device. Therefore, linearity between input and output signals is achieved and the current density of electrons passing through the grid is substantially uniform. In addition, when this combination is further combined with the wall anode 30 which is inherently capable of high heat dissipation, a device results which is even more capable of high heat dissipation than the above described cathode-grid combination with a more conventional air cooled anode would provide.

Referring now to FIG. 3 there is shown in some detail an actual device made in accordance with this invention. It will be appreciated that numerous modifications may be made without departing from the invention as disclosed. Beginning at the base of the device, there are provided two sheets 101 and 102 of metal which may be ¼ inch thick Monel mounted by means of bolts 103 to copper studs 104 which are brazed into Kovar cups which are sealed to a glass disc 105. A center rod 112 is held by a retaining ring recessed in one of the metal sheets 101 and also by a second retaining ring 106 each of which includes compartments having sapphire balls therein which act as bearings for the center rod 112. The center rod 112 engages at its upper end an upper support deck system 114. A spring 118, which may be of tungsten, is located concentric with the center rod 112 and bottoms against the lower metal sheet 101. A clip retainer 107, which may be of spring steel is forced into a groove in the center rod 112 for retaining the spring 118. A getter 113 is wrapped around the center rod 112.

In the upper support deck system 114, there is a support deck 141, which may be of .080 inch thickness molybdenum sheet, and three rods 142 which are riveted to the support deck 141 and which extend radially outward from the center. It will be appreciated that for simplicity the drawing omits certain repetitive details. The rods 142 may be .185 inch in diameter. Near the end of the rods 142 there are provided grooves in which a cross bar 143 in the form of a circular ring is supported. Slots cut in the cross bar 143 at opposite angles carry saddles 144 each of which in turn supports one hair-pin filament 110. The device shown employs six such filaments making a total of twelve filament strands. The filaments may be of tungsten. The lower ends of the hair-pin filaments 110 are attached to suport rods 151 which are arc-brazed to the metal sheets 101 and 102 by means of molybdenum clips 152. In order to place the filaments 110 under tension the entire structure is first loosely assembled, then the spring 118 is compressed by pushing down on the center rod 112 and locking the spring 118 into position by means of a nut and washer (not shown) at the upper end of the center rod 112. The filaments 110 are then attached to the rods 151 by the clips 152 by arc welding. The compressed spring 118 is then released with the result that a force is exerted through the center rod 112 and the support deck system 114 to the hair-pin filaments 110.

Use of the lever action provided by the cross bar 143 and the saddles 114 compensates for differential expansion of the filament legs while the upward force of the spring 118 compensates for the average longitudinal expansion of the filament hair-pins 110 when they are operated at elevated temperature. This action maintains uniformity of alignment of the filaments 110 under all conditions.

Surrounding the filaments 110 and its support structure is a cylindrical grid 120 having a first plurality of vertical wires 122 which are relatively closely spaced and a second plurality of horizontal wires 124 which are spaced from each other by a dimension of approximately the same magnitude. Both sets of wires may be platinum clad molybdenum having a diameter of about 0.020 inch.

The grid 120 is supported at the top by means of an insulating disk 126 which has a center aperture through which part of the center rod 112 extends. The insulating disk is attached to a metal sleeve 127 which may be of molybdenum. The metal sleeve 127 is spot welded to the grid wires. At the lower end, the vertical wires 122 are spot welded to a metal sleeve 128 which may be of molybdenum and which is joined to some of the copper studs 104 by bolts 129. Because of the small grid openings there is a more uniform field at the cathode surface which permits a sharper cut-off in the plate current characteristics and helps achieve linear operation of input and output waveforms in a push-pull amplifier.

Surrounding the grid there is a heavy wall anode 130 of copper having a thickness of approximately 0.250 inch. The anode 130 is sealed at its lower extremity to the glass base 105 such that it provides part of the external wall of the device so that it may be cooled by suitable liquid cooling means (not shown). Since the heating of the anode 130 is already substantially uniform due to the filament 110 and grid 120 configuration, the use of a heavy anode 130 permits very high currents to be drawn with the result that a very high dissipation and ultra linear device is provided.

While the present invention has been shown and described in certain forms only, it will be obvious to those skilled in the art that it is not so limited but is susceptible to various changes and modifications without departing from the spirit and scope thereof.

I claim as my invention:

1. In an electron discharge device, the combination comprising: a cathode comprising a plurality of electron emissive filaments disposed parallel to each other and defining a first cylinder, means to place said filaments under tension to prevent sagging due to thermal expansion; a grid to establish a uniform field of electrons comprising a first and second plurality of wires interconnected to form a plurality of quadrangular openings in said grid having sides of the same order of magnitude in length, said first plurality of wires confined to the locus of a second cylinder disposed concentrically about said first cylinder, said second plurality of wires confined to the locus of a third cylinder disposed concentrically about said first cylinder.

2. In an electron discharge device, the combination comprising: a cathode comprising a plurality of electron emissive filaments disposed parallel to each other and defining a first cylinder, means to place said filaments under controlled tension to prevent sagging due to thermal expansion at high operating temperatures; a cylindrical grid comprising a first plurality of wires in a first direction and a second plurality of wires in a second direction to form a plurality of parallelogrammatic openings in said grid having sides of the same order of magnitude in length to form a uniform field of electrons, said first plurality of wires maintained in the locus of a second cylinder disposed concentrically about said first cylinder, said second plurality of wires maintained in the locus of a third cylinder disposed concentrically about said second cylinder, said wire of said first and second pluralities of turns having substantially equal cross sectional dimensions.

3. In an electron discharge device, the combination comprising: a cathode comprising a plurality of electron emissive filaments disposed parallel to each other and defining a first cylinder, means to place said filaments under tension to prevent sagging due to thermal expansion; a grid comprising a first and second plurality of wires interconnected to form a plurality of quadrangular openings in said grid having sides of the same order of magnitude in length, said first plurality of wires maintained in the locus of a second cylinder disposed concentrically about said first cylinder, said second plurality of wires maintained in the locus of a third cylinder disposed concentrically about said first cylinder; an anode disposed around said grid and having relatively high lateral heat conductivity to permit large anode heat dissipation of energy of electrons bombarding thereon.

4. In an electron discharge device, the combination comprising: a cathode comprising a plurality of electron emissive filaments disposed parallel to each other and defining a cylinder, means to place said filaments under controlled tension to prevent sagging due to thermal expansion at high operating temperatures; a cylindrical grid comcomprising a first plurality of wires in a first direction and a second plurality of wires in a second direction to form a plurality of parallelogrammatic openings in said grid having sides of the same order of magnitude in length, said grid disposed around and all points thereof being equally spaced from said cylinder defined by said filaments, said wires of said first and second pluralities having substantially equal cross sectional dimensions; an anode comprising a cylindrical metallic member disposed around said grid and being of relatively large thickness to permit high lateral heat conduction of heat created by electrons incident thereto.

5. In an electron discharge device, the combination comprising: a cathode comprising a plurality of electron emissive filaments disposed parallel to each other and supported by a spring loaded tensioning means to place said filaments under controlled tension to prevent sagging due to thermal expansion at high operating temperatures, said filaments defining a first circular cylinder; a right circular basket grid to form a uniform flow of electrons comprising a first and second plurality of wires interconnected to form a plurality of approximately quadrangular openings in said grid having sides of the same order of magnitude in length, said first plurality of wires maintained in the locus of a second cylinder disposed concentrically about said first cylinder, said second plurality of wires maintained in the locus of a third cylinder disposed concentrically about said first cylinder; a cylindrical anode surrounding and co-axial with said grid, said anode having relatively large thickness to permit the rapid conduction of heat created by the uniform flow of electrons and serving as the vacuum envelope of said electron discharge device.

References Cited by the Examiner

UNITED STATES PATENTS

| | | | |
|---|---|---|---|
| 2,005,257 | 6/1935 | Eitel et al. | 313—293 |
| 2,367,615 | 1/1945 | Rively | 313—293 |
| 2,434,494 | 1/1948 | Gerner | 313—293 |
| 2,452,069 | 10/1948 | Reed | 313—293 |
| 2,647,298 | 8/1953 | Pryslak | 313—348 |
| 2,719,244 | 9/1955 | Dailey | 313—293 |

FOREIGN PATENTS

| | | |
|---|---|---|
| 896,685 | 11/1953 | Gearmany. |

DAVID J. GALVIN, *Primary Examiner.*

RALPH G. NILSON, BENNETT G. MILLER, *Examiners.*